United States Patent [19]
Kosco

[11] 3,877,000
[45] Apr. 8, 1975

[54] FAULT DETECTION CIRCUIT
[75] Inventor: William C. Kosco, Southfield, Mich.
[73] Assignee: La Salle Machine Tool, Inc., Warren, Mich.
[22] Filed: July 16, 1973
[21] Appl. No.: 379,463

[52] U.S. Cl.............................. 340/248 R; 340/282
[51] Int. Cl. ........................................... G08b 21/00
[58] Field of Search ........ 340/248 R, 253 R, 252 R, 340/282, 409

[56] References Cited
UNITED STATES PATENTS
3,056,120   9/1962   Mobarry ..................... 340/409 UX Primary Examiner—John W. Caldwell
Assistant Examiner—Daniel Myer
Attorney, Agent, or Firm—Olsen and Stephenson

[57] ABSTRACT

A fault detection circuit which employs an alternating current AND gate logic circuit and visual indicator circuits to detect and isolate partial short circuit conditions in a bank of limit switches which control the input signals to a larger alternating current logic control circuit system.

4 Claims, 1 Drawing Figure

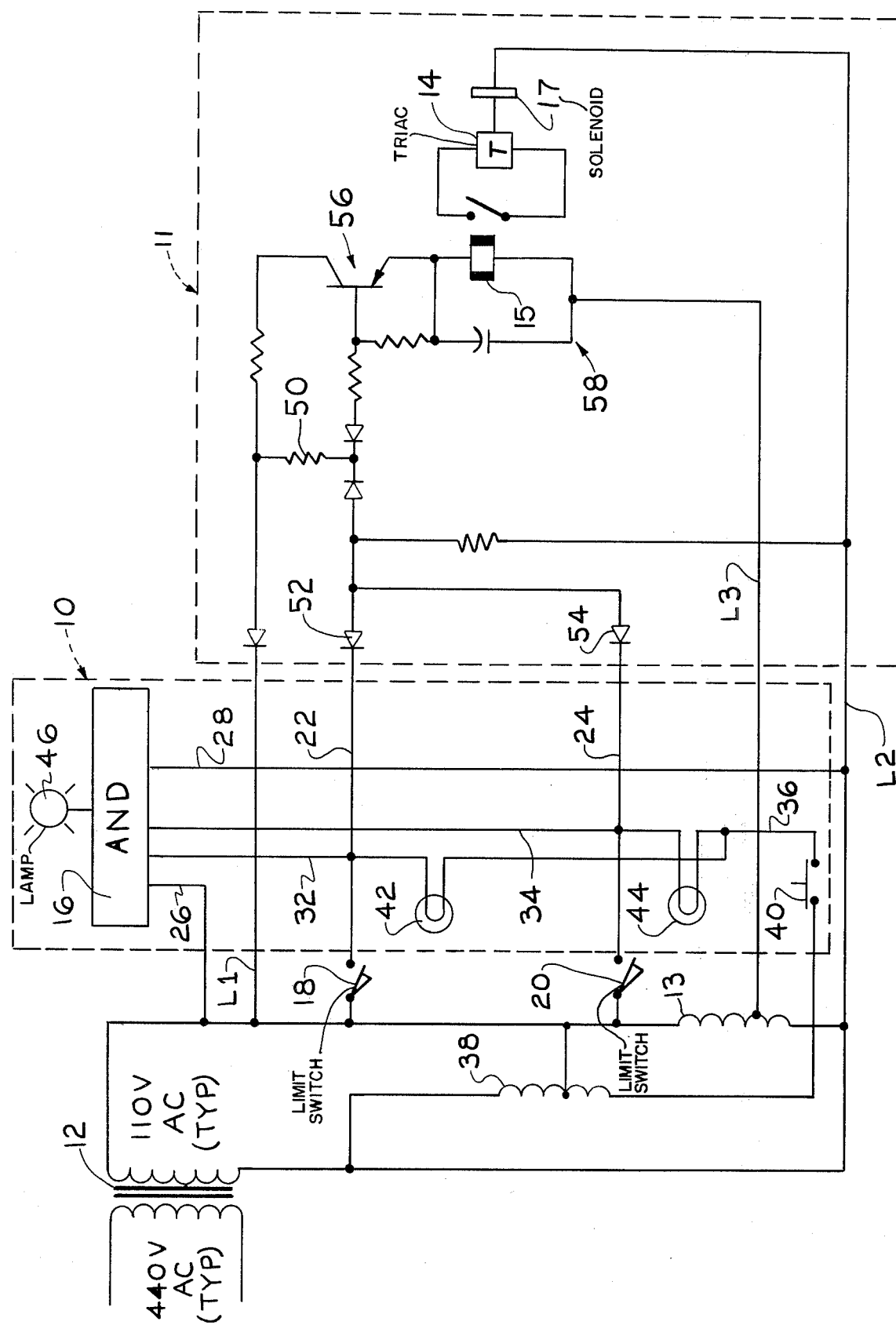

FAULT DETECTION CIRCUIT

CROSS REFERENCE TO RELATED APPLICATION

This application relates to fault detection circuits for logic systems of the type disclosed in my copending application Ser. No. 162,591 filed July 14, 1971, now U.S. Pat. No. 3,774,235.

BACKGROUND OF THE INVENTION

The area surrounding machine tool operations is frequently contaminated by the coolant which is used in large amounts to cool and lubricate tools and parts. These surroundings are not conducive to the smooth operation of machine tools and limit switches are especially vulnerable as they frequently must be located near the area of the workpieces and the tools. It is economically not feasible to effectively seal or isolate the switches, and to minimize down time, means to detect switches that are not operating properly is essential. This invention provides that means.

SUMMARY OF THE INVENTION

This invention relates to an electronic fault detection circuit which employs an AND gate AC logic circuit to detect potential sources of control system failure located in the array of limit switches and another circuit to pin point which switch is malfunctioning.

To illustrate, if two limit switches are used to control the advance and withdrawal of a tool, and the system is designed so that both switches cannot be ON or conducting simultaneously, an AND gate logic circuit connected across the output of the two limit switches would produce a warning signal whenever both switches were conducting at the same time. Once the problem is isolated to the limit switches, another circuit having a visual indicator for each limit switch and connected in parallel across each of the switches to the power source is used to apply a voltage across the terminals of each switch. The specific switch which is shorting completes the circuit and lights the particular indicator related to that switch.

It is an object of this invention to provide a continuous monitoring system for a plurality of limit switches in a larger electronic control system and a quick method of pin pointing the particular limit switch which is the potential source of a system failure.

Further objects, features and advantages of this invention will become apparent from a consideration of the following description, the appended claims, and the accompanying drawing which is a schematic circuit drawing illustrating the fault detection circuit of this invention in assembly relation with a typical logic control system.

With reference to the drawing, the fault detection circuit of this invention, indicated generally at 10, is illustrated in the drawing in assembly relation with a control system 11 which is described in detail in my aforementioned copending patent application. The circuit 11 is connected to two input lines $L_1$ and $L_2$. The lines $L_1$ and $L_2$ are connected to a conventional AC voltage source, indicated generally at 12, so that the voltage thereacross is on the order of 110 volts, for example. A reference voltage line $L_3$, connected to the circuit 11, is obtained through an intermediate connection to an autotransformer 13 so that the voltage drop across the lines $L_1$ and $L_3$ is less than 110 volts, for example, 40 volts. The purpose of the circuit 11 is to provide for closing, under predetermined conditions, of a reed relay 15 which in turn provides for energizing of an AC amplifier, such as a conventional Triac circuit 14, capable of producing a sufficiently powerful output signal to operate the machine element which is to be controlled, namely, a solenoid 17 in the illustrated circuit 11.

Limit switches 18 and 20 are connected to the circuit 11 by conductors 22 and 24. The illustrated circuit 11 is structured to perform an OR gate function, so that during the normal operation of the machine tool system associated with the limit switches 18 and 20, the limit switches 18 and 20 are never closed at the same time. For example, the switch 18 may be closed when a slide is in a forward position and the switch 20 may be closed when the slide is in a back position.

Briefly, the circuit 11 operates as follows. When both switches 18 and 20 are open, current will flow from $L_2$ to $L_1$ through a resistor 50 resulting in a voltage drop across the resistor 50. When either of the switches 18 or 20 is closed current will flow therethrough and through a diode 52 or 54 in series therewith from $L_2$ to $L_1$ thereby lowering the voltage drop across the resistor 50 to a predetermined level. A transistor 56, which is normally nonconductive, is made conductive by this voltage drop. When the transistor 56 conducts, a buffer and short duration memory circuit 58 is energized to in turn provide for energizing of the Triac circuit 14. Thus, in the circuit 11, the solenoid 17 is energized when either of the switches 18 or 20 is closed.

By virtue of the environment in which the switches 18 and 20 are located, it is desirable to know whenever there is flow of current through both switches 18 and 20 because such a situation indicates a clear malfunction of at least one of the switches. Such a malfunction is usually caused by the presence of machining coolant in a switch in sufficient quantity to allow a reduced strength signal to pass through the switch. The circuit 10 not only signals the existence of the malfunction but has the capability of locating which of the switches 18 or 20 is malfunctioning.

The fault detection circuit 10 includes an AND gate AC logic circuit 16 which is an AND version of the OR circuit 11 and is also disclosed in application Ser. No. 162,591. In the illustrated embodiment of the invention there are four leads into the logic circuit 16. Leads 26 and 28 are connected to $L_1$ and $L_2$, respectively, to provide power to logic circuit 16. The remaining two leads 32 and 34 are connected to the switches 18 and 20, respectively. A line 36 is connected to the voltage source through a power booster 38. By virtue of the power booster 38, when a manual switch 40 in the line 36 is closed, an increased voltage, 160 volts in a preferred embodiment, is applied across the switches 18 and 20.

The line 36 is connected to a pair of indicating lights 42 and 44. The lights 42 and 44 are also connected to the leads 32 and 34, respectively. A fault indicating light 46, or a suitable equivalent indicating means such as a horn or buzzer, constitutes the output for the AND circuit 16.

The values of the various circuit elements in the AC logic fault detection circuit 16 are selected such that a relatively small signal leakage across either limit switch, for example, 20% of either full line voltage or current or their product, will cause a positive warning signal to be registered by the light 46 whenever the other limit switch is closed. Comparatively, the elements of the logic control circuit 11 are selected such that the circuit will continue to function even though the signal level on input lines 22 and 24 is increased by leakage conditions for example to 80% of the full line voltage.

Because of the differences in sensitivity of the logic circuits 11 and 16, the fault detection circuit 10 is able to detect signal leakages across the terminals of the limit switches well before the control circuit 11 reads them as a positive signal. Therefore, potential control circuit problems are signalled by the light 46 prior to the occurrence of serious mechanical problems due to malfunction of circuit 11.

In the use of the circuit 10, when the light 46 signals a malfunction of a limit switch, the operator closes switch 40 at a time during the machine tool cycle when both switches 18 and 20 should be open. In the event the signal leakage is occurring at the switch 18, the light 42 will glow. If the light 44 glows, it is an indication that the switch 20 is malfunctioning. Thus the operator is able, by virtue of the fault detection circuit 10, to quickly identify the malfunctioning switch before the operation of the control circuit 11 is impaired.

It can thus be seen that this invention provides a fault detection circuit 10 for limit switches associated with an alternating current logic control circuit. It is within the purview of the invention to use the circuit 10 with any logic control circuit employing AC input lines like the lines 22 and 24. Similarly, the details of circuit 16 form no part of the present invention, it being only necessary that circuit 16 be capable of performing the AND function from AC inputs. It is also apparent that OR gates, operable at the 20% level, could be placed in the circuit 10 in front of the AND circuit 16 without departing from the invention.

What is claimed is:

1. A fault detection circuit for an alternating curreNt logic control circuit having an alternating current power source, a plurality of input lines, limit switches connected in series relationship to said input lines with a predetermined normal condition in which at least one of said switches is open, said input lines connecting said power source with said lôgic control circuit, said fault detection circuit comprising a plurality of input leads each of said input leads being connected to one of said input lines at a point between the limit switch connected in series therewith and said logic control circuit, and an alternating current AND gate logic circuit directly connected to each of said input leads and having an output constituting a fault signal.

2. A fault detection circuit according to claim 1 wherein said fault signal is a warning light.

3. A fault detection circuit as described in claim 1 further including a manually operated switch and a plurality of visual indicator lights each of said lights being connected in parallel with one of said input leads to provide means to apply an alternating voltage through said lights and across each of said limit switches to determine when an open switch is passing an electric signal.

4. A fault detection circuit as described in claim 3 further including means associated with said power source for applying a voltage across said limit switches through said lights of a magnitude greater than the voltage of said alternating current power source.

* * * * *